United States Patent [19]

Mazzola

[11] 4,292,995
[45] Oct. 6, 1981

[54] LOCKING VALVE APPARATUS
[75] Inventor: Mario Mazzola, New Canaan, Conn.
[73] Assignee: Richardson-Vicks Inc., Wilton, Conn.
[21] Appl. No.: 121,028
[22] Filed: Feb. 13, 1980
[51] Int. Cl.³ .............................................. F16K 35/06
[52] U.S. Cl. ................................. 137/384.2; 70/408; 251/284; 251/288
[58] Field of Search ............... 137/384.2, 384.4, 384.6, 137/384.8, 385; 251/284, 288; 70/176, 395, 408

[56] References Cited
U.S. PATENT DOCUMENTS
865,216  9/1907  Ullmann .................... 137/384.4 X Primary Examiner—Gerald A. Michalsky
Attorney, Agent, or Firm—George W. Rauchfuss, Jr.

[57] ABSTRACT

The locking valve apparatus includes a valve housing containing a rotatable cylinder lock with a keyway extending into the cylinder from one end and with a stationary cylindrical member of the valve housing encircling this rotatable cylinder. An alignment element on the outside of this stationary cylindrical member is adapted to position, align and guide a removable handle for the valve. This removable handle includes a sleeve defining a socket which is adapted to nest over the stationary cylindrical member of the valve housing when the handle is engaged for operating the valve. A key is located inside of this sleeve socket, being adjustably secured therein, and the socket is provided with a slot, which the user of the handle must align with the alignment element, otherwise the handle cannot be positioned on the valve housing. Accordingly, when the handle socket is placed on the valve housing with the slot being slid over the alignment element, the key becomes properly positioned for entry into the keyway and the handle becomes properly positioned for operating the locking valve mechanism. Furthermore, the interior end of this slot connects with a second arcuate slot adapted to receive the alignment element for permitting the handle to be turned relative to the valve housing only when the socket has been fully seated, thereby protecting the key itself from being twisted until it has been fully inserted into the keyway.

11 Claims, 14 Drawing Figures

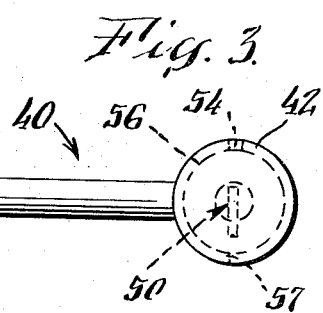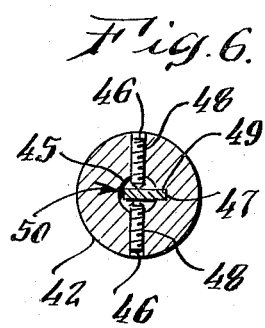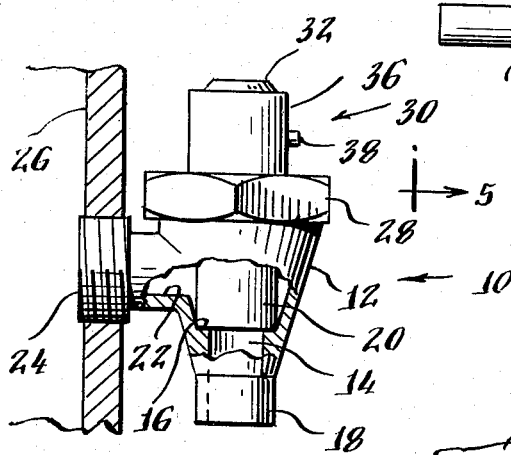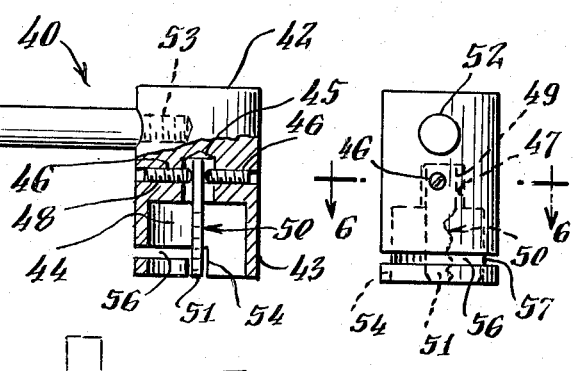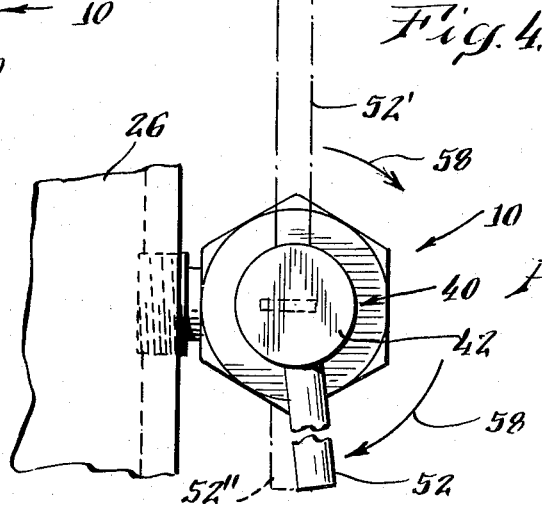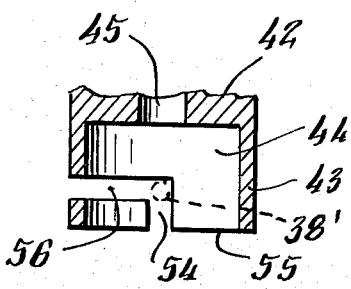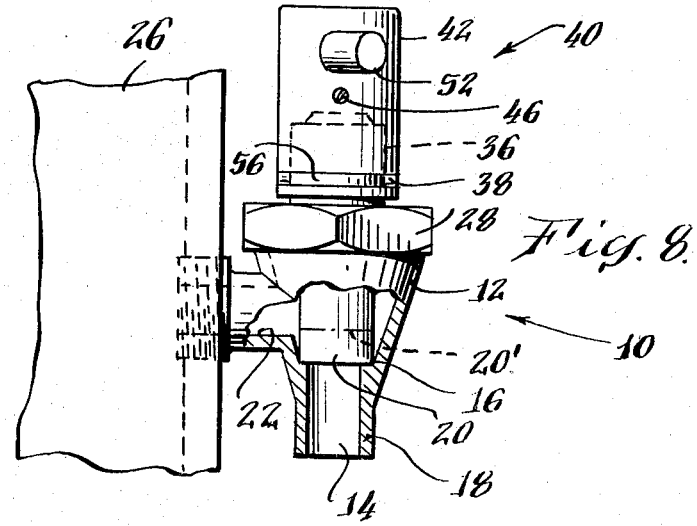

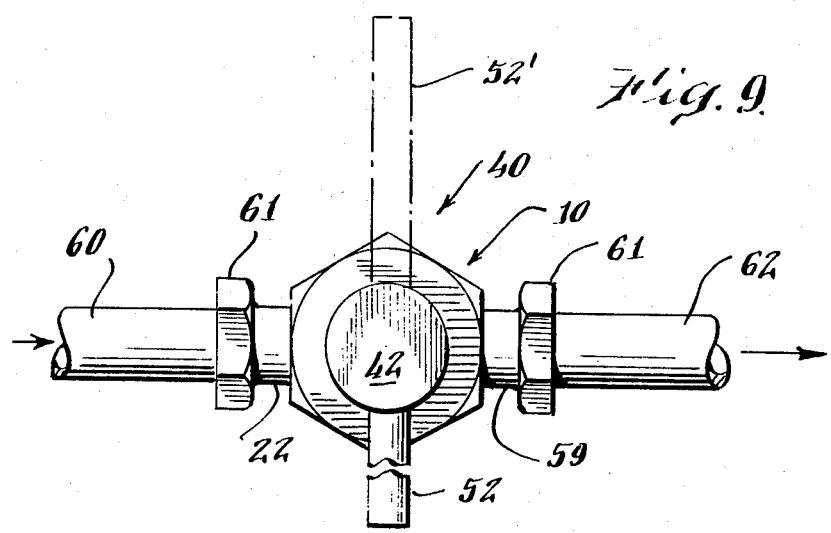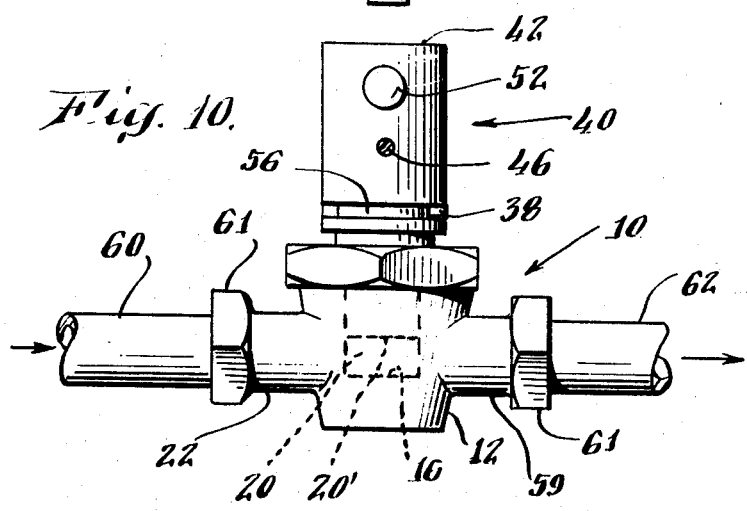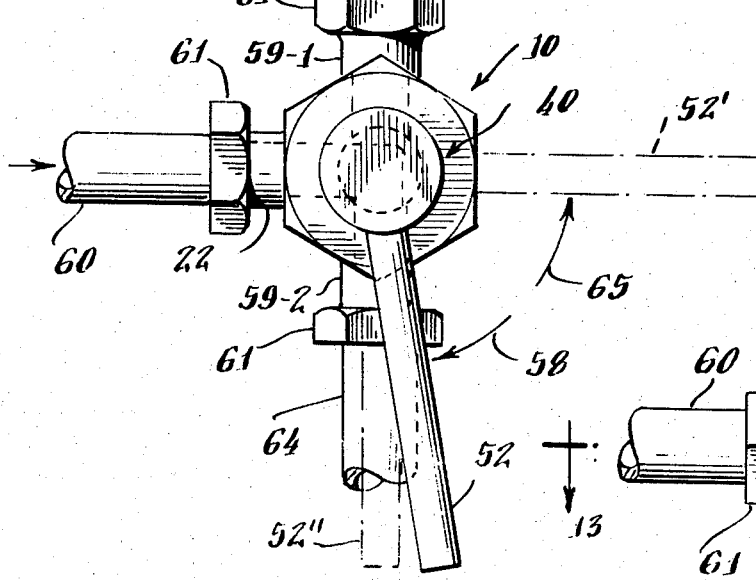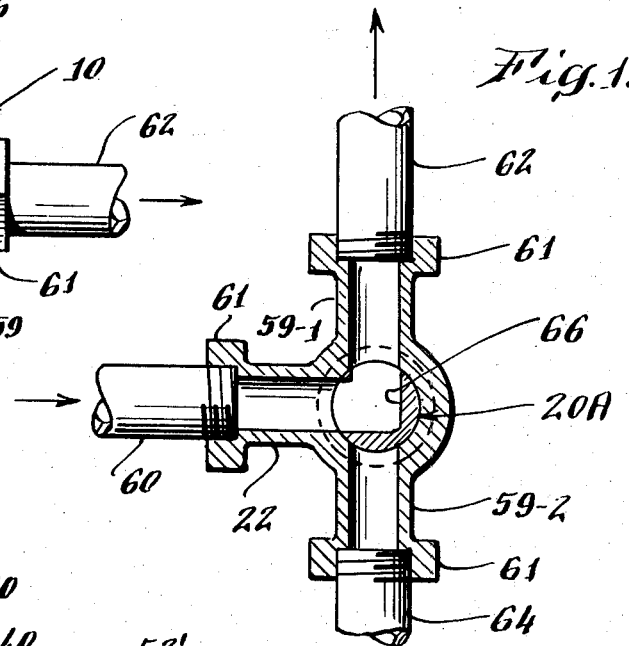

LOCKING VALVE APPARATUS

FIELD OF THE INVENTION

This invention relates to a locking valve apparatus, and more particularly to such an apparatus in which the key is housed in a socket in a handle which is adapted to fit onto the valve housing containing the lock for controlling the valve with which the lock is associated.

BACKGROUND

There are various applications in which valves are used for controlling fluid and where it is desirable to lock the valve in a predetermined position so that no one can tamper with or inadvertently change the valve control of the fluid flow. Dispensing valves have been provided for this purpose which utilize a regular key adapted to be turned in a lock to open and close the dispensing valve to which the lock is attached.

Among the problems encountered with such prior art lockable dispensing valves are the effects of pressure from the fluid on the closed valve or the build up of deposits in the valve housing resulting from the fluid flowing therethrough, which may hinder or inhibit operation of the valve by means of the key.

Such balky valve operation encourages too much force on the key which can snap the key off the lock, possibly resulting in the destruction of the valve in trying to extract the broken key. Another problem is turning the key too far, which can damage the valve or strain the key, such that repeated overturning, twisting of the key shears it off in the lock.

Furthermore, in the operation of the key, particularly if the lock is stuck or is difficult to manipulate with the key, it may be possible to turn the key to such a position that the valve is partially open or closed with the key either left in or removed from the lock, thereby resulting in an indeterminate valve setting. With such a locking valve it is intended that the valve be completely open or fully closed, when the key is removed, so that the valve will function in a predetermined manner under the sole control of the authorized operator who has responsibility for use of the key.

SUMMARY

Accordingly, it is an object of this invention to provide a locking valve apparatus which provides increased leverage for conveniently opening and closing a key-operated valve and which encourages the operator always to leave the valve fully open or fully closed as intended by the lock installation.

A further object of this invention is to provide a locking valve apparatus in which the key can be removed from a locked valve in only one predetermined valve position so that it is not possible to remove the key and leave the valve in a wrong position and moreover which discourages the responsible operator from leaving the key exposed in the lock.

Still another object of this invention is to provide a locking valve apparatus which provides automatic turning limitation, preventing the key from being turned in the lock other than a predetermined amount, in order to prevent breakage of the key.

A still further object of this invention is to provide a new and improved locking valve apparatus which is convenient and easy to operate and may be utilized in a variety of applications such as dispensing, switching fluid flow as well as controlling on-off through-put fluid control.

Among the advantages resulting from the use of the present invention are those resulting from the fact that the operator is mechanically prevented from turning the key in the lock until the key has been fully inserted into the keyway, thereby avoiding inadvertent damage to the key and/or lock from inaccurate key-twisting manipulation.

In carrying out this invention in one illustrative embodiment thereof, a valve housing containing a rotatable cylinder lock with a keyway extending into the cylinder from one end has a stationary cylindrical member encircling the rotatable lock cylinder. An alignment element, shown in the form of a fixed stud, protrudes from the outside cylindrical surface of this stationary member. This stud serves to position, to align and to guide a removable handle for the valve. Included in the handle is a sleeve defining a socket adapted to nest over the stationary cylindrical member when the handle is engaged on the valve for operating the valve. The key is located inside of this sleeve socket, being adjustably secured therein, and there is a slot in the socket which the user must align with the stud, otherwise the removable handle cannot be engaged on the valve housing. Thus, advantageously, when the handle socket is nested on the valve housing with the slot being slid over the stud, the key becomes properly positioned for entry into the keyway and the handle becomes properly positioned for operating the locking valve mechanism. In addition, the interior end of this slot connects with a second arcuate slot adapted to receive the stud for permitting the handle to be turned only when the socket has been fully seated. Thus, the key itself is protected from being twisted until it has been fully inserted into the keyway. The predetermined length of this arcuate slot equals the desired limit of turning movement, so that the stud also acts as a stop for preventing further turning of the handle when the end of the arcuate slot abuts against the stud, to avoid damage to the key and/or valve being operated by the handle.

As a further advantage, the engagement of this stud into the arcuate slot acts as a "keeper" for preventing the handle from being prematurely separated from the valve housing. The handle cannot be removed until the operator has fully returned the valve lock to its intended initial position.

Advantageously, the above apparatus may be applied to the dispensing of fluids from a container, controlling the movement of fluid through a pipe, or switching the flow of fluid into different conduits.

BRIEF DESCRIPTION OF THE DRAWINGS

The invention, together with further objects, aspects and advantages thereof, will be better understood from a consideration of the following description taken in connection with the accompanying drawings in which like parts will bear the same reference characters in the several embodiments.

FIG. 1 is a top plan view of a locking valve apparatus embodying the present invention coupled to a liquid container for dispensing liquid when the valve is unlocked.

FIG. 2 is a side elevational view, partly in section, of the embodiment shown in FIG. 1.

FIG. 3 is a top plan view of a handle and key-holding socket unit in accordance with the present invention, which may be utilized to operate the valve shown in FIGS. 1 and 2.

FIG. 4 is a side elevational view, partly in section, of the handle unit shown in FIG. 3.

FIG. 4A is an enlarged view of the lower portion of FIG. 4, with the key removed for more clearly illustrating the alignment and keeper slots.

FIG. 5 is a different side elevational view of the handle unit shown in FIG. 4, as seen looking at the end of the handle lever in the direction 5—5 of FIG. 4.

FIG. 6 is a cross-sectional view taken along line 6—6 of FIG. 5 looking downwardly.

FIG. 7 is a top view of the locking valve liquid dispenser shown in FIG. 1 with the handle positioned on the lockable valve housing and illustrating various handle positions occurring during operation of the handle.

FIG. 8 is a side elevational view partly in section showing the handle positioned on the lockable valve as illustrated in FIG. 7.

FIG. 9 is a top plan view of the locking valve apparatus embodying the invention and being installed in an on-off through-put liquid flow control application.

FIG. 10 is a side elevational view of the embodiment illustrated in FIG. 9.

FIG. 11 is a top plan view of locking valve apparatus embodying the present invention utilized in a switching arrangement for directing the fluid through the valve in either of two different directions.

FIG. 12 is a side elevational view of the embodiment shown in FIG. 11.

FIG. 13 is a cross-sectional view taken along line 13—13 of FIG. 12.

DESCRIPTION OF THE PREFERRED EMBODIMENTS

Referring now to FIGS. 1 and 2, a lockable valve, referred to generally by the reference character 10, has a truncated conical housing 12 containing a dispensing passage 14 associated with an annular valve seat 16 and having an outlet nozzle 18 at the lower end thereof. There is an inlet pipe 22 communicated with the passage 14 when the valve 10 is unlocked and opened. The threaded end 24 of the inlet pipe 22 is mounted in a container, storage tank, liquid reservoir, or the like container 26 which holds liquid to be dispensed by the valve 10. A cylindrical tumbler lock, referred to generally by the reference character 30, is secured by a hexagonal coupling nut 28 onto the upper end of the housing 12 of the valve 10.

The lock 30 includes a rotary cylinder 32 having a keyway 34 extending axially from the upper end of the cylinder, which is positioned in a stationary cylindrical member 36 having an alignment element 38 protruding therefrom and being shown in the form of a fixed stud. The rotary cylinder 32 is mechanically connected by a conventional valve screw (not shown) with a valve plunger 20 which abuts against the valve seat 16 when the valve 10 is closed (or shut), thereby blocking communication between the inlet pipe 22 and the dispensing passage 14. When the lock 30 is unlocked by a key, the cylinder 32 can be turned causing the conventional valve screw mentioned above to raise the valve plunger 20 away from the valve seat 16, thereby allowing liquid to be dispensed from the container 26 through the valve 10 and out through the passage 14 and nozzle 18.

It is to be understood that the liquid dispensing valve 10 as described above is known in the prior art and is commercially available, except for the fixed alignment element or stud 38, protruding from the front surface of the stationary cylindrical member 36, which is novel. It is to be noted that the stationary cylindrical member 36 encircles the rotary cylinder 32 of the lock 30.

Accordingly, the valve 10 can be operated by placing a key in the keyway 34, turning the key for causing the rotary cylinder 32 to be turned by the key, thereby unlocking the lock and raising or lowering the valve plunger 20 coupled thereto for opening or closing the valve 10.

As pointed out previously, among the problems with a plain key operated valve are those resulting from the difficulty in turning the key to control the operation of the valve, particularly when the valve is balky or tends to stick due to deposits or from the fluid pressure or other causes. A plain key provides very little leverage and therefore encourages the application of excessive and awkward manual forces to the key shank in attempting to actuate the valve by turning of the key. Such forceful manipulation may readily cause the bending or the breaking of the key in the lock with consequent need to extract the broken key portion and other possible problems which may ultimately result in the replacement of the entire valve.

To alleviate this as well as other problems, a handle and key-holding socket unit, referred to generally by the reference character 40, is provided as is shown in FIGS. 3 through 6. This handle unit 40 has a cylindrical head 42 with a lower cylindrical sleeve 43 defining a socket 44. The sleeve 43 extends down from the head 42 in the manner of a skirt for defining the socket 44. The internal diameter (ID) of this socket 44 is just slightly greater than the outside diameter (OD) of the stationary cylindrical member 36 of the valve housing. Therefore, the socket 44 can be nested down snuggly onto the cylindrical member 36.

In order to hold a key there is a bore hole 45 drilled up into the head 42 at the upper end of the socket 44. This bore hole 45 axially extends up into the head 42 so that it is concentrically positioned with respect to the socket 44. A key element 50 is adjustably secured in this bore hole or recess 45 by means of a pair of diametrically opposed set screws 46 whose inner ends are engaged against opposite sides of the key. An advantageous three-point holding action is provided for the key 50 as will be described. There is an axially extending groove or notch 47 formed in the wall of the recess 45, and the key 50 has an inverted L-shaped as seen in FIG. 5. Thus, the head of the key has an offset portion 49 which fits into the groove or notch 47, while the set screws are oriented orthogonal to the groove 47 to engage against opposite sides of the head of the key at a location which is spaced laterally away from the offset portion 49 as seen clearly in FIG. 6. Consequently, two-points of the holding action for the key 50 occur where the two set screws 46 engage against opposite sides of the head of the key. The third point of the holding action occurs along the margin of the offset portion 49 where it fits very snuggly (with almost a force-fit) into the groove 47. Consequently, the head of the key is secured very firmly in the socket 45, and nevertheless its shank 51 can be adjusted in position both laterally and longitudinally with respect to the socket 44 in order to provide precise minor trimming adjustment for alignment of the key with the keyway 34 (FIG. 1).

The pair of set screws 46 are threaded through radial bores 48 extending through the head 42 into the concentric recess 45 (See FIG. 6). The handle unit 40 includes a convenient-to-use lever-like handle 52 projecting radially from one side of the head 42. This lever handle 52 may be rigidly fastened to the head 42 in any suitable manner, for example by screwing its inner end 53 into a threaded hole in the head 42, or it may be unitary with the head.

In order to assure that the user will place the handle unit 40 onto the cylindrical member 36 of the valve housing in the desired predetermined initial position, interchangeable alignment means are provided. For example, the sleeve 43 has an axially extending slot 54 (please see FIG. 4A) which extends upwardly from the lower rim 55 of the skirt-like sleeve 43 for engagement by the stud element 38. There is a second slot 56 which connects in perpendicular relationship with the upper end of the first slot 54. This second slot 56 is arcuate in configuration and extends horizontally around one-half of the circumference of the sleeve 43, and the end of this arcuate slot 56 is indicated at 57. Looking downwardly upon the handle unit 40, as shown in FIG. 3, it is seen that the vertical slot 54 is located 90° clockwise from the handle lever 53, and the end 57 of the arcuate keeper slot 56 is located 90° counterclockwise from the lever handle 53. This arcuate slot 56 extends around the sleeve 180° passing below the handle 52 as seen in FIGS. 3, 4 and 5. This arcuate slot serves for captivating the handle unit onto the valve housing when the handle unit is turned away from its initial position.

The alignment stud 38 (FIGS. 1 and 2) is intended to enter into the lower end of the vertical slot 54 when the socket 44 is properly positioned and aligned to slide smoothly down over the cylindrical member 36 bringing the tip of the key shank 51 down into proper position for the key shank to advance correctly in alignment into the keyway 34. It is to be noted that when the lever handle 52 is held by a right-handed user with the head 42 protruding from the thumb side of the right hand and with the rim 55 of the socket sleeve 43 facing downwardly, then the vertical slot 54 is facing toward the user and appears to be centered with respect to the sleeve 43 surrounding the socket 44. Also, the alignment stud 38 is positioned in the center of the front of the stationary cylindrical member 36 of the valve housing 12. Consequently, it is very convenient for a right-handed user to align the lower end of the vertical slot 54 with the stud 38 so that the shank 51 of the key will slide smoothly into the keyway 34. Then, the socket 44 can be seated fully down onto the valve housing, and the shank 51 of the key becomes fully inserted into the keyway 34 so that the key is in the correct fully inserted position for unlocking the lock.

When the socket 44 of the handle unit 40 is fully seated on the valve housing the stud 38 assumes the position as shown dotted at 38' in FIG. 4A where the stud 38' is at the upper end of the vertical slot 54 and is now aligned with the beginning of the arcuate slot 56. Therefore, the handle can now be turned in a clockwise direction as seen looking downwardly as shown by turning arrows 58 in FIG. 7. Until the socket 44 is fully seated in place on the valve housing, the alignment stud 38 cooperatively acts as a protective stop in the slot 54 because it is captivated between the sidewalls of this vertical slot. Only when the stud reaches the upper end of the slot as shown at 38' in FIG. 4A can the handle unit 40 be turned, and in this manner the key and lock are protected against premature twisting of the key until it is fully inserted in the lock.

Although the particular structure as shown is most convenient for use by a right-handed person, it will be understood that this structure is also much easier for a left-handed person to use than a plain key.

FIGS. 7 and 8 illustrate the handle unit 40 fully mounted on the lockable valve 10. The initial position of the lever handle 52 is shown in dash and dot outline at 52' in FIG. 7. The full-line drawing of the lever handle at 52 in FIG. 7 shows the lever handle nearing its final position for fully opening the valve plunger 20. In this final position as indicated in dash and dot outline at 52' the handle unit has been turned 180°. The arcuate slot 56 in the head 42 of the handle unit 40 has a predetermined length which corresponds to the amount of rotation necessary for the rotary cylinder 32 of the lock 30 to fully open the valve plunger 20 simultaneously with the unlocking of the lock, which are in effect the same functions, since the valve plunger 20 is raised by the turning motion of the rotary cylinder 32. The lever handle 52 provides leverage so that the lock cylinder 32 is easily rotatable, as illustrated by the arrows 58 in FIG. 7.

The arcuate slot 56 when its end 57 comes into contact with the alignment stud 38 acts as a stop and prevents further rotation of the handle unit 40, thus preventing damage to the key and/or valve which might otherwise be caused by overturning of the key.

It will be noted that when the handle is turned away from its initial position 52' to captivate the alignment stud 38 in any part of the arcuate slot 56, then the handle unit 40 cannot be removed from the lock. Only when the handle unit 40 is turned back fully to its initial position on the lock 30 such that the alignment stud 38 enters the vertical slot 54, can the handle be removed. Therefore, the handle can only be removed in one position, so it is impossible to leave the key in the wrong position in the lock with the valve partially opened or closed. Also, with the alignment stud 38 acting as a stop, the operator knows exactly where to stop turning the handle in either the opening or closing direction so to prevent key breakage.

In FIG. 8 the dotted line at 20' indicates the lower end of the valve plunger 20 in its fully open position.

The embodiment shown in FIGS. 1 through 8 illustrates the use of the lockable valve 10 as applied to a dispensing operation. In this embodiment, fluid from the container or dispenser 26 is controlled by the lockable valve 10. Such an application may include the dispensing of beverages such as soda, milk, whiskey, beer, etc. or the dispensing of other types of fluids such as oil, solvents, cleaning fluids, etc. where it may be desirable to regulate the dispensing operation by providing a suitable lock on the dispenser. It can be readily appreciated that it certainly would be undesirable to break a key in such an application.

FIGS. 9 and 10 illustrate another embodiment in which the valve 10 and its associated handle unit 40 are applied in an on-off through-put situation. In this application, the valve housing 12 is sealed off at the bottom, and in addition to an inlet pipe 22, an outlet pipe 59 is provided which communicates with the interior of valve housing 12 below (downstream) from the annular seat 16. The inlet pipe 22 of the valve 10 is coupled to a supply pipe 60 by a coupling 61, and the valve outlet pipe 59 is capable of delivering the liquid which is to be controlled into a discharge pipeline 62 when the valve 10 is open. The valve is opened by raising the plunger 20 to its open position as indicated at 20', where it is spaced away from the annular seat 16, thereby allowing the fluid to flow down past this seat into the lower portion of the valve housing and thence out of the outlet pipe 59. The valve outlet pipe 59 is coupled to the discharge line 62 by another coupling 61. It will be seen that the same problems occur when using a plain key in this embodiment, as occur with respect to the embodiment of FIGS. 1 through 8. Where it is desired to lock or seal off the flow of liquid through the discharge line 62 for security or economic reasons, use of a plain key may entail a problem in the same manner as specified before, namely the possibility of breaking the key, the difficulty of turning a key to open the valve, etc.

The initial lever handle position in which the valve 10 is shut and locked is shown in FIG. 9 in dash and dotted lines at 52', and the fully open valve handle position is shown in full lines at 52.

In FIGS. 11 through 13 another embodiment is disclosed in which the lockable valve 10 embodying the present invention is applied to a switching operation, in which the flow of fluid to be controlled may be diverted by operation of the valve in different directions into different discharge lines. To this end, the supply pipe 60 is coupled by the coupling 61 to the inlet pipe 22 of the valve 10 and is selectively joined by the valve 10 with discharge pipes 62 and 64. There are two valve outlet pipes 59-1 and 59-2 coupled by their coupling 61 to the respective discharge lines 62 and 64. As will be seen in FIG. 11, when the handle 40 is swung into one position 52", the valve 10 directs the fluid from the supply pipe 60 through the valve 10 and out the discharge pipe line 62, as illustrated by the flow arrows in FIGS. 11 and 13. The arrow 58 and the full line drawing 52 in FIG. 11 shows the lever handle being swung over toward its final position 52".

On the other hand, when the handle is turned over as shown at 65 to the other position 52', the valve 10 directs the incoming fluid from the supply pipe 60 through the valve 10 and out the discharge pipe 64. In this embodiment the valve element 20A is a rotary cylinder having an elbow passage 66, and it is rotated by the key 50 into two different orthogonal positions which open one discharge line and close the other, and vice versa.

The initial position of the handle is at 52' in both FIGS. 9 and 11, and then the alignment stud 38 is free to slide out of the keeper slot 56 so that the handle unit 40 can be removed from the valve housing. In the embodiment of FIGS. 11 through 13, the arcuate slot 56 has a circumferential length of 90°, and the initial and final positions of the lever handle at 52' and 52" are at right angles to each other.

It will be understood that various valve structures can be used, the internal arrangements of which will differ in accordance with the particular application. However, the present invention is directed to a lockable valve structure where it is desired to control the flow of fluid by a lockable valve mechanism and where it is desired to control that mechanism by a handle unit which is aligned with and inserts a key into the lockable valve, instead of using a key per se to perform the control function on the valve lock.

It is contemplated by the present inventor that the alignment stud 38 and the slots 54 and 56 can be reversed in relationship between the handle unit 40 and the stationary cylindrical member 36 on the valve housing. In other words, the socket 44 is formed with an internal alignment stud protruding radially inwardly from the sleeve 43, and the two slots 54 and 56 are omitted from the sleeve 43 so that this sleeve is an uninterrupted cylindrical surface. Then, the stationary cylindrical member 36 has a vertical slot milled into its exterior surface extending downwardly from its upper end. This vertical slot corresponds with the vertical slot 54 previously located in the sleeve 43. Also, the stationary cylinder 36 has an arcuate slot milled into its exterior surface commencing at the lower end of the vertical slot. This arcuate slot corresponds with the arcuate slot 56 previously located in the sleeve 43, and the circumferential length of this arcuate slot is equal to the desired limit of rotary movement of the valve. Since the stud alignment means is now on the inside of the socket 44 where it cannot be viewed when the handle unit is being used, there is an index mark on the exterior surface of the sleeve 43 near its rim 55 so that the user can visually align the index mark with the upper end of the vertical slot in the cylindrical member 36. Thus the internal socket stud is conveniently aligned with the external vertical slot in the cylindrical member 36 so that the handle unit 40 can be fully seated in place. Then the internal stud becomes aligned with the external arcuate slot on the cylindrical member 36 so that the handle can be turned. The external arcuate slot on the cylindrical member 36 captivates the internal stud so that the handle unit cannot be removed until it is returned to its initial position.

Therefore, the claims are intended to read upon the embodiments as shown in which the stud alignment means 38 is externally located on the cylindrical member 36 and the slots 54 and 56 are formed in the sleeve 43. These claims are intended to cover the equivalent reversal arrangement as described above in which the stud is internally located in the socket and the slots 54 and 56 are externally located on the cylindrical valve member 36.

Further, it is to be understood that in the embodiments as shown the slots 54 and 56 can be formed in the inner surface of the wall of the sleeve 43 without cutting completely through the sleeve wall. In such a case there is an index mark on the exterior surface of the sleeve 43 near its rim 55 in alignment with the internal vertical slot 54 for visual alignment with the stud 38. Therefore, the words "slot" and "slots" are to be interpreted sufficiently broadly to include a slot and slots formed in a wall surface and which do not cut completely through the wall involved.

Since other changes and modifications varied to fit particular operating requirements and environments will be understood by those skilled in the art, the invention is not considered limited to the examples chosen for purposes of illustration, and includes all changes and modifications which do not constitute a departure from the true spirit and scope of this invention.

I claim:

1. In locking valve apparatus including a housing containing a flow control valve and a rotatable lock cylinder for locking the valve, said lock cylinder having a keyway extending therein from one end into which a key must be engagingly inserted when said lock cylinder is in an initial locked position in order to unlock the lock cylinder for turning the lock cylinder into a different position for unlocking the valve and wherein said housing includes a stationary cylindrical portion encircling the lock cylinder, the invention comprising:

a removable handle unit including a hollow portion defining a socket, said hollow socket portion having an effective inside diameter (ID) slightly larger than the outside diameter (OD) of said stationary cylindrical portion of the valve housing for seating thereon in snug freely turning relationship, a key mounted in said socket, interengageable alignment means on said valve housing and on said hollow portion of the handle unit in predetermined positions for preventing said socket from being fully seated onto said portion of the valve housing unless said alignment means are interengaged for assuring insertion of the key into said keyway in proper position when said lock cylinder is in its initial position, keeper means for preventing said handle unit from being removed from the valve housing when the handle unit is turned away from its initial position, and stop means for limiting the turning movement of the handle to correspond with the desired turning limit of the lock cylinder.

2. In locking valve apparatus including a housing containing a flow control valve and a rotatable lock cylinder for locking the valve, said lock cylinder having a keyway extending therein from one end into which a key must be engagingly inserted when said lock cylinder is in an initial locked position in order to unlock the lock cylinder for turning the lock cylinder into a different position for changing the valve setting and wherein said housing includes a stationary cylindrical portion encircling the lock cylinder, the invention comprising:

a removable handle unit including a hollow cylindrical portion defining a socket, said hollow cylindrical portion of the handle unit having an inside diameter (ID) slightly larger than the outside diameter (OD) of said stationary cylindrical portion of the valve housing for nesting said hollow cylindrical portion of the handle unit over said stationary cylindrical portion of the valve housing in snug freely turning relationship, a first of said cylindrical portions having protruding alignment means, the other of said cylindrical portions having two slots therein, one of said slots extending axially in said latter cylindrical portion from one end for a predetermined distance, the second of said slots being an arcuate slot extending in a circumferential direction in said latter cylindrical portion for an angular distance equal to the desired angular turning limit of said lock cylinder, one end of said arcuate slot having a juncture with said axial slot at the end of said axial slot which is spaced away from the end of said latter cylindrical portion, and a key extending generally in an axial direction being mounted in said handle unit within said socket in a predetermined position for entry into said keyway when said hollow cylindrical portion of the handle unit is nested over said hollow cylindrical portion of the valve housing with said axial slot in initial position in alignment with said alignment means, whereby said alignment means enters said axial slot as the handle unit is nested onto the valve housing for preventing premature turning of the handle unit until said alignment means has reached said juncture for assuring proper entry of the key into the keyway before the handle unit is turned by the user, and whereby turning of said handle unit unlocks the lock cylinder and causes said alignment means to enter said arcuate slot for captivating the handle unit on the valve housing for preventing removal of the handle unit until it has been turned back to its initial position for assuring relocking of the lock cylinder before the handle unit is removed.

3. In locking valve apparatus, the invention as claimed in claim 2 in which:

said protruding alignment means is a stud protruding radially from said first cylindrical portion.

4. In locking valve apparatus, the invention as claimed in claim 3 in which:

said first cylindrical portion is the stationary cylindrical portion of the valve housing and said stud protrudes radially outwardly from the exterior surface thereof.

5. In locking valve apparatus, the invention as claimed in any one of claims 2, 3 or 4 in which:

said key is adjustably mounted in said socket of said handle unit.

6. In locking valve apparatus, the invention as claimed in claim 5 in which:

said handle unit has a recess therein communicating with the inner end of said socket, the head of said key being mounted in said recess with the shank of said key extending axially into said socket.

7. In locking valve apparatus, the invention as claimed in claim 6 in which:

said handle unit has an axial groove in said recess, the edge of the head of said key fits into said groove, and a pair of set screws in said handle unit engage against opposite sides of the keyhead at a position laterally offset from said groove.

8. Locking valve apparatus comprising:

a valve having a housing and being adapted to be coupled to a conduit for controlling the flow of fluid therein, a lock mounted in said valve housing and having a rotary lock cylinder with a keyway therein and being positioned in a stationary cylinder, said lock cylinder being connected to the valve for operation of the valve, an alignment element positioned on said stationary cylinder, a handle unit having a socket sized to seat rotatably on said stationary cylinder with a key adjustably mounted therein, a slot extending axially in said socket for guiding the positioning of said handle on said valve housing with said key entering said keyway in said lock cylinder when said handle is initially placed on said valve housing with said slot aligned with said alignment element, a second slot extending a predetermined arcuate distance in said socket, said acuate slot commencing at the inner end of said axial slot, and said alignment element entering said arcuate slot after said handle unit is fully seated in said stationary cylinder and is turned from its initial position for acting as a keeper in said arcuate slot and for acting as a stop for said handle after the handle is turned said predetermined arcuate distance.

9. The locking valve apparatus set forth in claim 8 wherein:

said key is adjustably mounted in said handle unit by a pair of set screws adjustably positioned in a pair of bores extending into said handle unit on opposite sides of the head of said key.

10. The locking valve apparatus set forth in claim 8 in which:

said key is mounted in said socket with the shank of the key extending in an axial direction within said socket.

11. In locking valve apparatus including a housing containing a flow control valve and a rotatable lock cylinder for actuating said valve, said lock cylinder having a keyway extending therein from one end in which a key must be inserted fully when said lock cylinder is in an initial locked position in order to unlock the lock cylinder so that it can be turned by the key into a different position for changing the flow conditions being controlled by the valve, and wherein said housing has a stationary cylindrical member encircling said lock cylinder, the invention comprising:

alignment means protruding from the exterior surface of said cylindrical member, a handle unit having a cylindrical sleeve defining a socket having a lower rim and having an internal diameter (ID) only slightly larger than the outside diameter (OD) of said stationary member for adapting said socket to be nested over said cylindrical member in snug but freely turning relationship, said sleeve having a first slot commencing at the lower rim of said socket and extending vertically upwardly therein, said sleeve also having a second slot of arcuate configuration commencing at the upper end of said vertical slot and extending horizontally circumferentially with respect to said socket by an angular distance equal to the desired turning limit of said rotatable lock cylinder, said handle unit having a key mounted in said socket in a predetermined position for entering said keyway when said handle unit is nested over said cylindrical member in an initial position with said alignment means entering said vertical slot, said key being mounted in said socket in said predetermined position for full insertion into said keyway when said alignment means has reached the juncture of said vertical and arcuate slots for permitting said handle to be turned away from its initial position for unlocking the lock for operating the valve, and said alignment means entering said arcuate slot when the handle unit is turned from its initial position for captivating the handle unit onto the valve housing until the handle unit has been turned back to its initial position, thereby assuring relocking of the lock cylinder before the handle unit can be removed.

* * * * *